United States Patent
Jain et al.

(10) Patent No.: US 7,346,746 B2
(45) Date of Patent: Mar. 18, 2008

(54) HIGH PERFORMANCE ARCHITECTURE WITH SHARED MEMORY

(75) Inventors: Raj Kumar Jain, Mandarin Gardens (SG); Rudi Frenzel, Munich (DE)

(73) Assignee: Infineon Technologies Aktiengesellschaft, Munich (DE)

( * ) Notice: Subject to any disclaimer, the term of this patent is extended or adjusted under 35 U.S.C. 154(b) by 1057 days.

(21) Appl. No.: 10/133,941

(22) Filed: Apr. 26, 2002

(65) Prior Publication Data

US 2003/0204665 A1    Oct. 30, 2003

(51) Int. Cl.
G06F 12/08    (2006.01)
(52) U.S. Cl. .................. 711/150; 711/151; 711/209
(58) Field of Classification Search ............... 711/5, 711/127, 147, 148, 150, 151, 152, 153, 157, 711/173
See application file for complete search history.

(56) References Cited

U.S. PATENT DOCUMENTS

| | | | | |
|---|---|---|---|---|
| 5,261,068 A | * | 11/1993 | Gaskins et al. | 711/157 |
| 5,329,629 A | * | 7/1994 | Horst et al. | 711/5 |
| 5,412,788 A | * | 5/1995 | Collins et al. | 711/157 |
| 5,561,784 A | * | 10/1996 | Chen et al. | 711/157 |
| 5,848,428 A | * | 12/1998 | Collins | 711/127 |
| 6,272,594 B1 | * | 8/2001 | Gupta et al. | 711/127 |
| 2003/0088744 A1 | * | 5/2003 | Jain et al. | 711/150 |

* cited by examiner

*Primary Examiner*—Donald A Sparks
*Assistant Examiner*—Jesse Diller
(74) *Attorney, Agent, or Firm*—Horizon IP Pte Ltd

(57) ABSTRACT

A system with multiple processors sharing a single memory module without noticeable performance degradation is described. The memory module is divided into n independently addressable banks, where n is at least 2 and mapped such that sequential addresses are rotated between the banks. A bank may be further divided into a plurality of blocks. A cache is provided to enable a processor to fetch from memory a plurality of data words from different memory banks to reduce memory latency caused by memory contention.

8 Claims, 6 Drawing Sheets

HIGH PERFORMANCE ARCHITECTURE WITH SHARED MEMORY

This application claims the priority of copending patent application titled "Improved Architecture with Shared Memory", U.S. Ser. No. 10/117,668, filed on Apr. 4, 2002, which is herein incorporated by reference for all purposes.

FIELD OF THE INVENTION

The present invention relates generally to integrated circuits (ICs). More particularly, the invention relates to high performance architectures with shared memory.

BACKGROUND OF THE INVENTION

Figure 1:
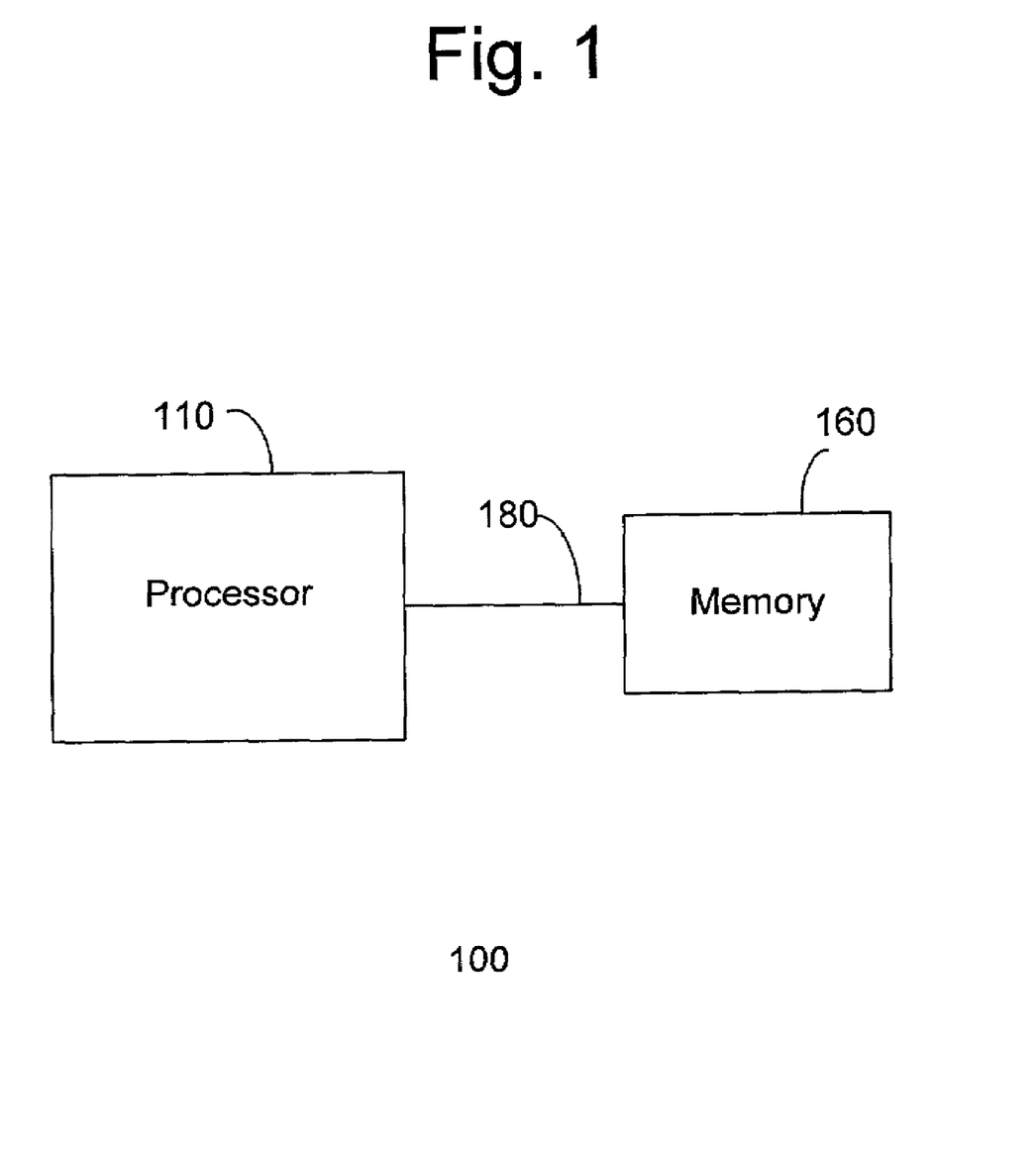
FIG. 1 shows a block diagram of conventional SOC.

FIG. 1 shows a block diagram of a portion of a conventional system-on-chip (SOC) 100, such as a digital signal processor (DSP). As shown, the SOC includes a processor 110 coupled to a memory module 160 via a bus 180. The memory module stores a computer program comprising a sequence of instructions. During operation of the SOC, the processor retrieves and executes the computer instructions from memory to perform the desired function.

SOCs can be provided with multiple processors. However, conventional memory modules are only capable of being accessed by one processor at a time. Thus, if memory is busy (i.e., accessed by another processor for program execution), a processor which desires to access the busy memory module must wait and remain idle until the memory is available upon completion of program execution. This can severely hinder system performance since a processor must remain idle for the duration of program execution. To avoid performance degradation in multi-processor SOCs caused by memory conflicts, each processor is associated with its own memory module. However, providing duplicate memory modules increases the size of the chip, which undesirably hinders miniaturization as well as increases cost of manufacturing.

As evidenced from the above discussion, it is desirable to provide a system in which the processors can share a memory module to reduce chip size without incurring the performance penalty of conventional designs.

SUMMARY OF THE INVENTION

The invention relates, in one embodiment, to a method of sharing a memory module between a plurality of processors. The memory module is divided into n banks, where n=at least 2, enabling the memory module to be accessed by one or more processors simultaneously. The memory module is mapped to allocate sequential addresses to alternate banks of the memory, where sequential data words are stored in alternate banks due to the mapping of the memory. In one embodiment, first and second signal paths are provided between the memory module and a processor. The first signal path couples a cache to a processor and memory module for enabling the processor to fetch a plurality of data words from different banks simultaneously. This reduces memory latency caused by memory contention. The second signal path couples the memory module directly to the processor.

PREFERRED EMBODIMENTS OF THE INVENTION

Figure 2:
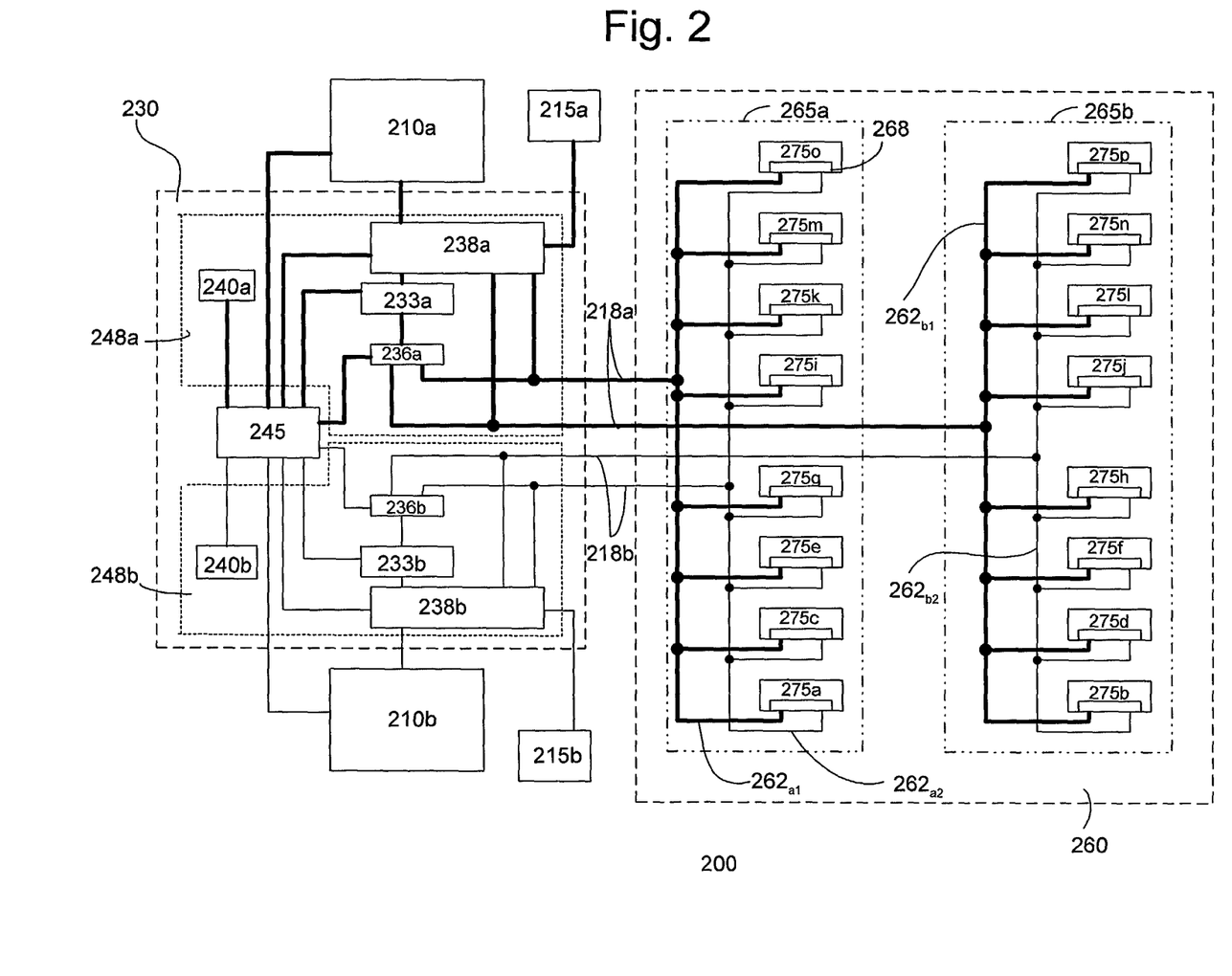
FIG. 2 shows a system in accordance with one embodiment of the invention.

FIG. 2 shows a block diagram of a portion of a system 200 in accordance with one embodiment of the invention. The system comprises, for example, multiple digital signal processors (DSPs) for multi-port digital subscriber line (DSL) applications on a single chip. The system comprises m processors 210 coupled to a system controller 230, where m is a whole number equal to or greater than 2. Illustratively, the system comprises first and second processors 210a-b (m=2). Providing more than two processors is also useful.

A memory module 260 is provided for sharing among the processors. Data words accessed by the processors are stored in the memory module. A data word comprises a group of bits (e.g. 32 bits). In one embodiment, the data words comprise program instructions, which are accessed by the processors from the memory module via memory buses (e.g. 218a and 218b) for execution. The data words can also comprise application data.

In accordance with one embodiment of the invention, the memory module is shared between the processors without noticeable performance degradation, eliminating the need to provide duplicate memory modules for each processor. Noticeable performance degradation is avoided by separating the memory module into n number of independently operable banks (e.g. 265a and 265b), where n is a number greater than or equal to 2. Preferably, n=the number of processors in the system (i.e. n=m). Since the memory banks operate independently, the different banks can be simultaneously accessed during the same clock cycle.

In another embodiment the banks can be further subdivided into x number of independently accessible blocks 275a-p, where x is an integer greater than or equal to 1. A bank, for example, is subdivided into 8 independently accessible blocks. Generally, the greater the number of blocks, the lower the probability of contention. The number of blocks, in one embodiment, is selected to optimize performance and reduce contention. The blocks are coupled to the memory bus via internal memory buses $262_{a1-a2}$ and $262_{b1-b2}$.

The blocks of the memory array have, for example, control circuitry 268 to appropriately place data on the memory buses (e.g. 218a or 218b) to the processors (210a or 210b) via internal memory buses $262_{a1-a2}$ and $262_{b1-b2}$. The control circuitry comprises, for example, multiplexing circuitry or tri-state buffers to direct the data to the respective processors. By providing independent blocks within a bank, the processors can advantageously access different blocks simultaneously, irrespective of whether they are from the same bank or not. This further increases system performance by reducing potential conflicts between processors.

Furthermore, the memory is mapped so that contiguous memory addresses are rotated between the different memory banks. For example, in a two-bank memory module (e.g., bank 0 and bank 1), one bank (bank 0) would be assigned the even addresses while odd addresses are assigned to the other bank (bank 1). This would result in data words in sequential addresses being located in alternate memory banks, such as data word 1 in bank 0, data word 2 in bank 1, data word 3 in bank 0 and so forth. In one embodiment, the data words comprise program instructions. Since program instructions are executed in sequence with the exception of jumps (e.g., branch and loop instructions), a processor would generally access different banks of the memory module during program execution. By synchronizing or staggering the processors to execute the program so that the processors access different memory banks in the same cycle, multiple processors can execute the same program stored in memory module 260 simultaneously.

An arbitration control unit (ACU) 245 being coupled to the processor via the data bus and to the memory module via the memory bus is provided. The ACU controls access to the memory by the processors. In the event of a memory contention (e.g., two processors accessing the same bank simultaneously), the ACU determines which processor has priority to access the memory module while the other processors are locked (e.g. by executing a wait state or cycle). This generally synchronizes the processors to access different banks in the subsequent clock cycles.

In one embodiment, a priority register is provided to indicate which processor has priority. In the case of a system with two processors, the priority register may comprise one bit (P bit). Additional bits may be included to accommodate additional number of processors. The priority register is updated after the occurrence of contention to rotate the priority between the processors. For example, a value of '1' in the P bit indicates that the first processor has priority and a '0' indicates that the second processor has priority. During each cycle where a contention occurs, the P bit is toggled, switching the priority of the processors. Other types of arbitration schemes are also useful.

Optionally, the processors can be provided with respective critical memory modules 215. The critical memory module, for example, is smaller than the main memory module 260 and is used for storing programs or subroutines which are accessed frequently by the processors (e.g., MIPS critical). The use of critical memory modules enhances system performance by reducing memory conflicts without going to the extent of significantly increasing chip size.

The ACU 245 is coupled to n control logic units (CLUs), one for each of the n processors. Illustratively, the ACU comprises first CLU 248a and second CLU 248b for first processor 210a and second processor 210b respectively. When a CLU is activated, its respective processor is allowed access to the memory module. In one embodiment, the CLU is coupled to a processor and to the n banks of memory module, enabling the processor to access the n memory banks simultaneously. Since the bandwidth of a processor is equal to the bandwidth of a memory bank, the CLU allows the processor to fetch from memory more words than needed. In one embodiment, the processor can potentially fetch twice the data words needed.

In one embodiment, the CLU comprises first (cache) and second (normal) signal paths. The cache signal path comprises, for example, a cache register (233a or 233b) and a multiplexer (236a or 236b). When the cache path is selected, the processor coupled to the CLU accesses the first and second memory banks (265a-b). In one embodiment, the current address location (Addr), as specified by the processor, and the next address (Addr+1) are accessed. The multiplexer selects the word at (Addr+1) and stores it in the cache while the word at the current address (Addr) is passed to the processor. The address of the word stored in the cache is stored in, for example, a cache address register (240a or 240b). If the second path (normal) is selected, the processor accesses the current memory location. The CLU passes the data word at the current memory location to the processor via the second path. By providing a cache to store data in subsequent addresses, the probability of data access from memory is lowered, hence reducing memory latency caused by memory contention.

The processors can be provided with respective critical memory modules 215a and 215b via critical memory controllers 238a-b. The critical memory module, for example, is smaller than the main memory module 260 and is used for storing data (e.g. programs or subroutines) which are accessed frequently by the processors (e.g., MIPS critical). The use of critical memory modules enhances system performance by reducing memory conflicts without going to the extent of significantly increasing chip size.

Figure 3:
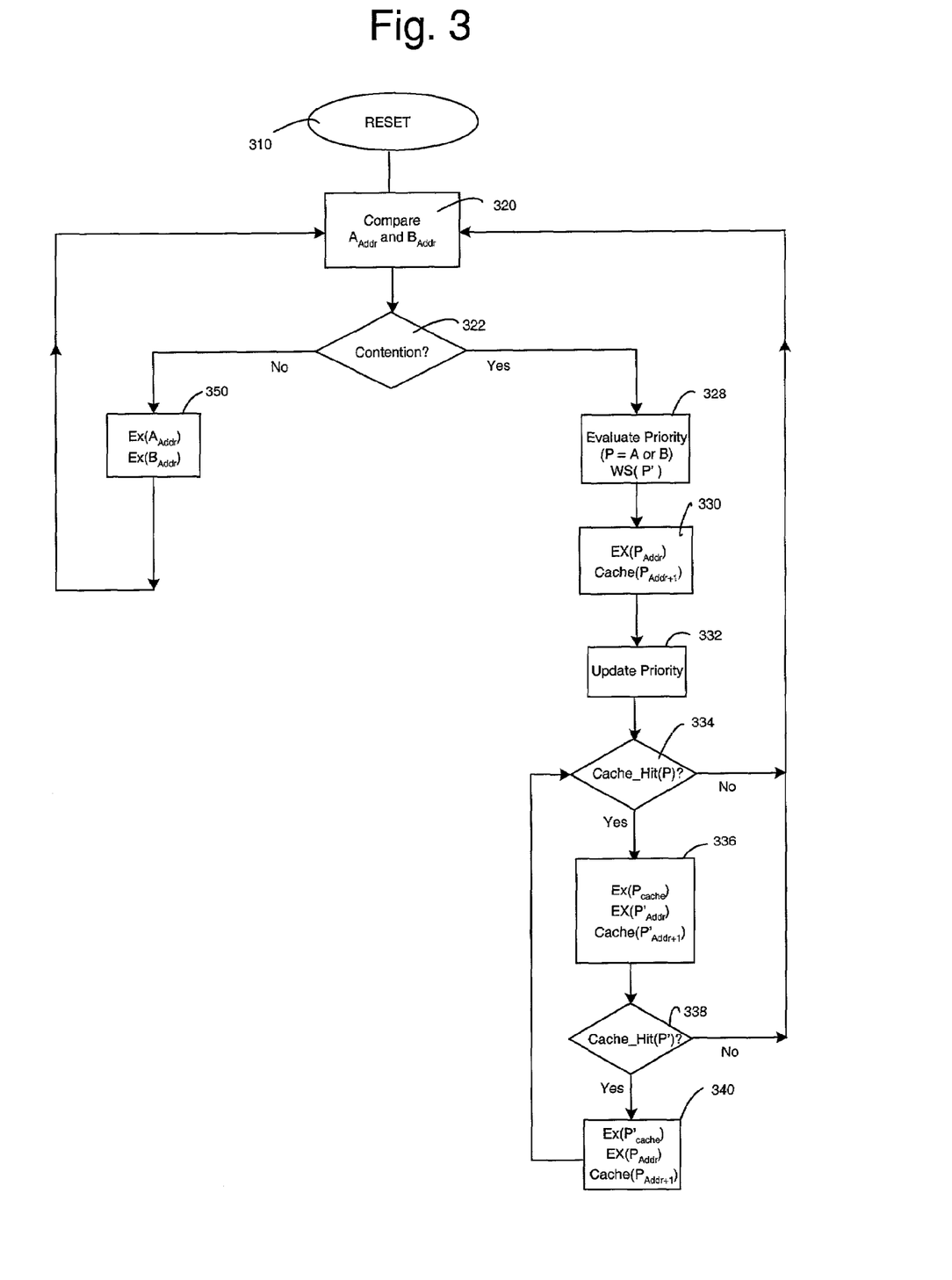
FIGS. 3-4 show flow diagrams of an arbitration unit in accordance with various embodiments of the invention.

FIG. 3 shows a process flow of an ACU state machine in accordance with one embodiment of the invention. As shown, the ACU controls accesses by first and second processors (A or B). The ACU system is initialized (310), for example, before system operation (e.g., system power up). Initialization includes, for example, setting the priority bit to indicate which processor has priority in the event of a memory contention. The priority register, for example, is set to give processor A priority.

During operation of the system, the processors issue respective memory addresses corresponding to the memory access in the next clock cycle ($A_{Addr}$ and $B_{Addr}$ representing the memory addresses currently issued by processor A and processor B). The ACU determines whether there is a memory contention or not at steps 320 and 322, e.g., whether the processors are accessing the same memory range or not. The memory range coincides, in one embodiment, with a memory block. In another embodiment, the memory range coincides with memory blocks in different banks, the memory blocks comprising consecutive addresses. If no contention exists, processors A and B access respective banks of the memory module at step 350. In one embodiment, the CLUs of processors A and B are activated with the normal signal paths selected. Thus, each processor retrieves data words from respective memory banks at addresses $A_{Addr}$ and $B_{Addr}$.

If a contention occurs, the ACU evaluates the priority register to determine which processor has access priority at step 326. The processor P with access priority (e.g., processor A) is allowed access to the memory while the other processor P' with lower priority executes a wait state (e.g., processor B) at step 328. Hence, if the processors subsequently access data words in sequential locations in the next cycles, different banks will be accessed without executing wait-states. By synchronizing or staggering the processors to execute the program so that the processors access different memory banks in the same cycle, multiple processors can execute the same program stored in memory module 260 simultaneously without contention.

In one embodiment, the CLU of processor P is activated with the cache signal path selected, at step 330. The data from the current address $P_{Addr}$ and the next consecutive address $P_{Addr+1}$ are fetched from the memory banks. The data in the current address $P_{Addr}$ is passed to the processor P for access and data in the next address $P_{Addr+1}$ is stored in the cache register. The ACU updates the priority at step 332 for the next contention evaluation at step 322.

The ACU determines at step 334 if a new address $P_{Addr}$ specified by the processor P in the next cycle matches the address of the cache data (i.e. cache hit). If a cache miss occurs, the process is repeated by evaluating the addresses specified by processors A and B for contention at step 320. In one embodiment, the data in the cache register associated with processor P is discarded.

A cache hit would allow processor P to continue execution by retrieving the data from the cache instead of memory, thus avoiding the insertion of a wait-state at step 336. In one embodiment, the CLU of processor P' is activated with the cache signal path selected at step 334. The data from the current address $P'_{Addr}$ and the next address $P'_{Addr+1}$ are fetched from the memory banks. The data in the current address $P'_{Addr}$ is passed to the processor P' for access and the data in the next address $P'_{Addr+1}$ is stored in the cache register associated with P'. If there is a cache hit for processor P' in the next cycle, the cache data is accessed by the processor P' at step 340. The data in the current address $P_{Addr}$ of processor P accessed by the processor and the data in the next address $P_{Addr+1}$ is stored in the cache register associated with P. There is no need to check for contention as only one processor is accessing the memory. The determination of a cache hit for processor P is repeated at step 334. If a cache miss for P' occurs at step 338, the ACU repeats the whole process at step.

Figure 4:
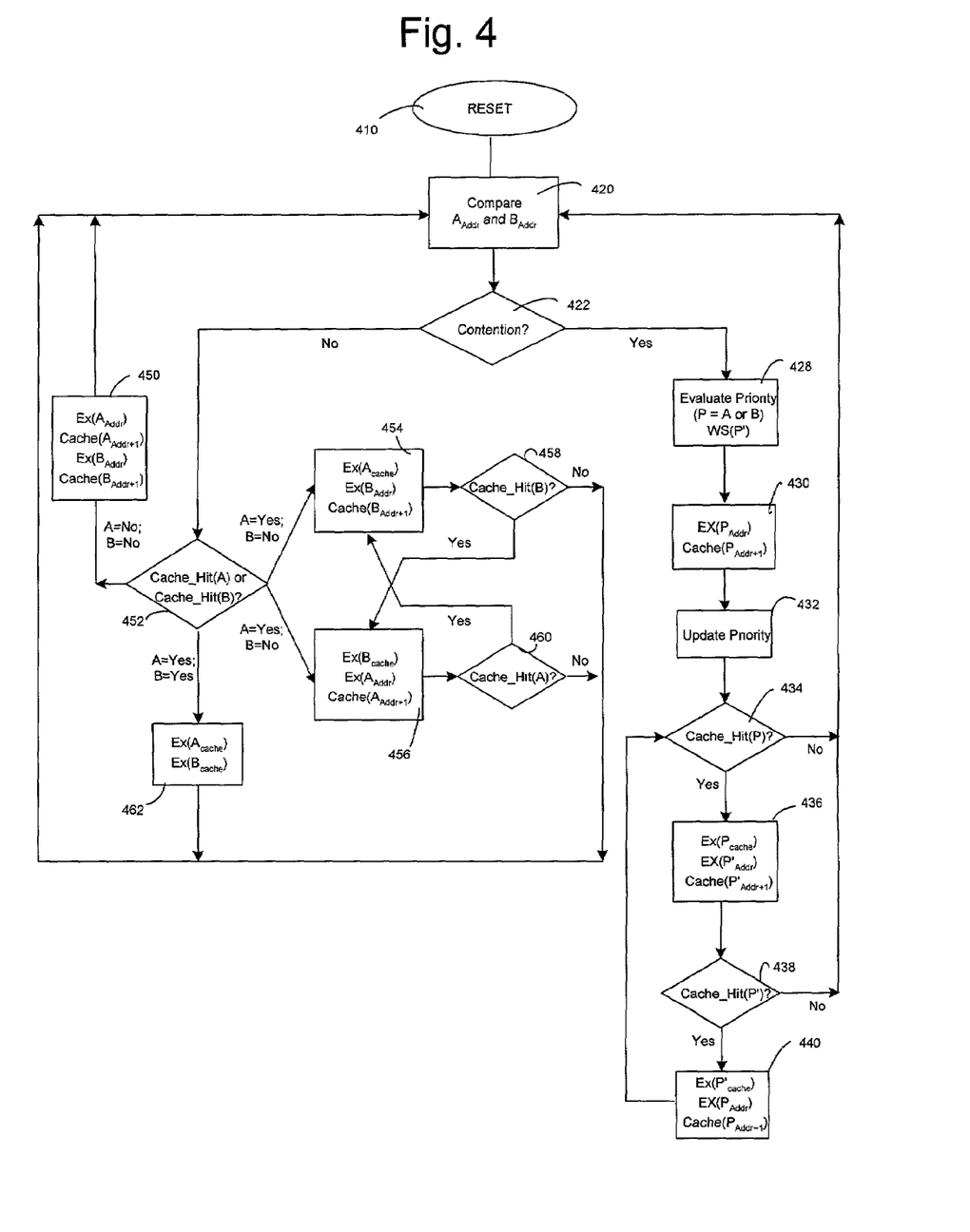

In another embodiment shown in FIG. 4, the ACU comprises the cache signal path for each processor, the cache signal path allowing more data words to be fetched from memory than requested by the processor. The cache signal path comprises, for example, a cache register and a multiplexer. During the operation of the system, the addresses issued by processors A and B are evaluated for contention at steps 420 and 422. If contention exists, the priority is evaluated and wait states are inserted for the processor with lower priority as previously described in FIG. 3.

If no contention exists, the caches associated with both processors are evaluated for cache hit at step 452. If no cache hits are found, processors A and B access respective banks of the memory module at step 450 via the respective cache signal paths. In one embodiment, the CLUs of processors A and B are activated with the cache paths selected. The data in the current memory addresses ($A_{Addr}$ and $B_{Addr}$) is passed to the respective processors for access and data in the next consecutive addresses ($A_{Addr+1}$ and $B_{Addr+1}$) is stored in the respective cache registers. If cache hits are detected for both processors, the respective cache contents are accessed by the processors at step 462 and the process repeats at step 420.

If a cache hit is found for only one of the processors, memory access may continue for the other processor without the need to test for contention since only one processor is accessing the memory. For example, if a cache hit is detected for processor A and a cache miss is detected for processor B, the contents of the cache associated with processor A is accessed while the data from the current memory address $B_{Addr}$ is accessed by processor B at step 454. Data from the memory at the next location $B_{Addr+1}$ is stored in the cache associated with processor B. In the next cycle, the cache for processor B is monitored again for a cache hit. If a cache hit occurs, the cache contents for processor B is retrieved at step 456. The data from memory at address $A_{Addr}$ will be fetched for processor A. A cache miss at step 458 will cause the process to be repeated from step 420.

Figure 5:
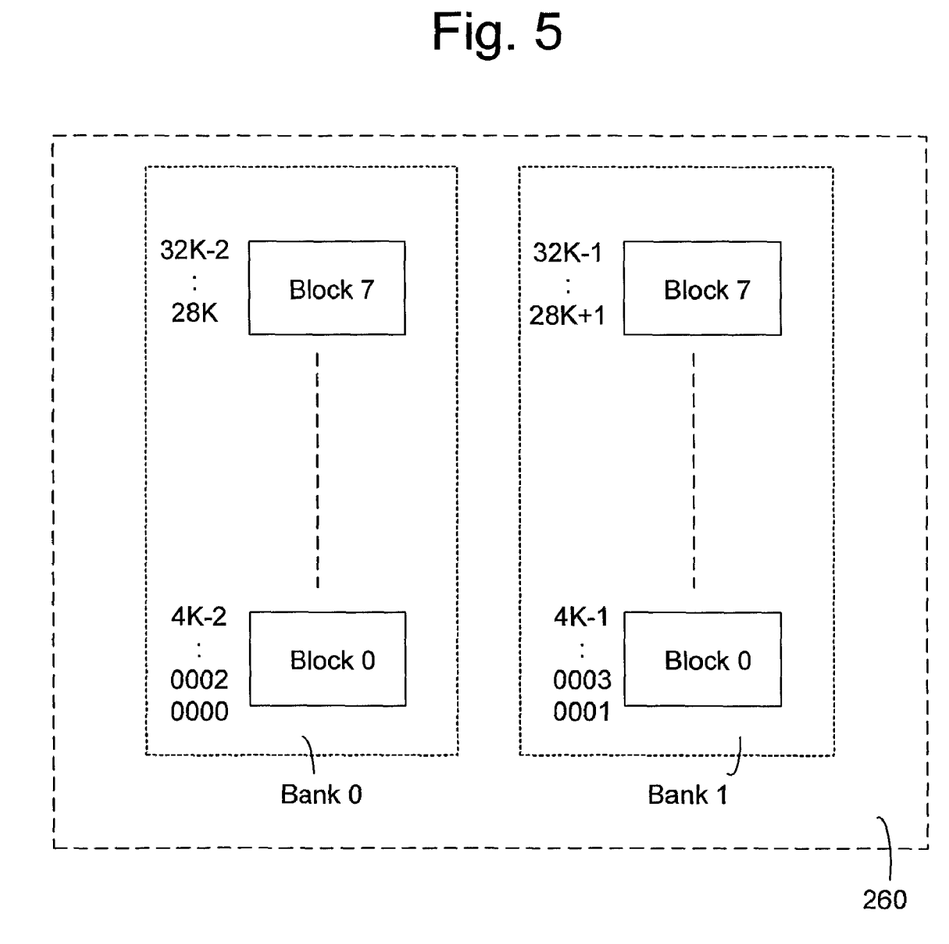
FIGS. 5-6 show memory modules in accordance with various embodiments of the invention.
Figure 6:
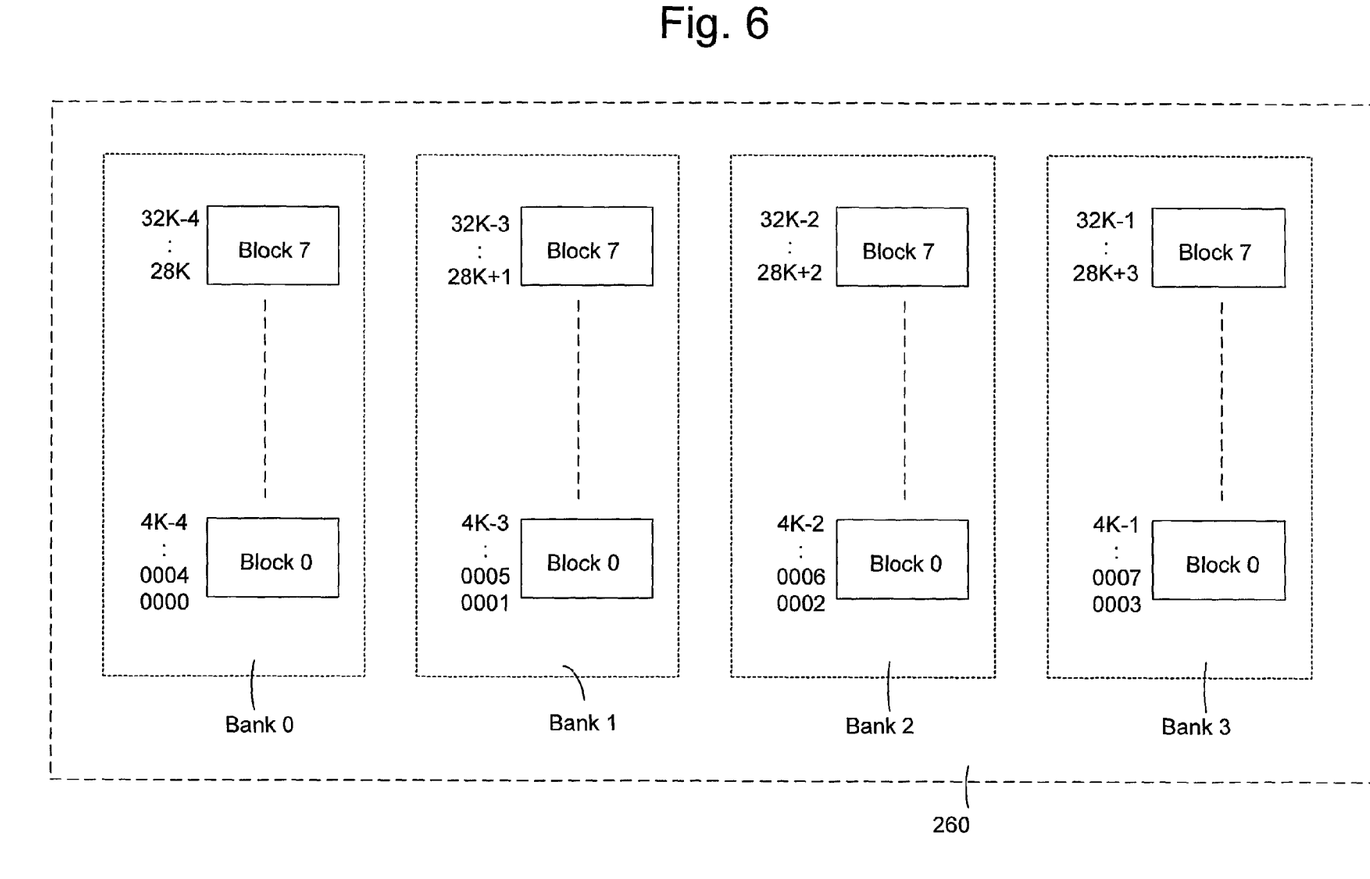

FIGS. 5-6 illustrate the mapping of memory in accordance with different embodiments of the invention. Referring to FIG. 5, a memory module 260 with 2 banks (Bank 0 and Bank 1) each subdivided into 8 blocks (Blocks 0-7) is shown. Illustratively, assuming that the memory module comprises 512 Kb of memory with a width of 16 bits, a block being allocated 2K addressable locations (2K×16 bits×16 blocks). In one embodiment, even addresses are allocated to bank 0 (i.e., 0, 2, 4 ... 32K-2) and odd addresses to bank 1 (i.e., 1, 3, 5 ... 32K-1). Block 0 of bank 0 would have addresses 0, 2, 4 ... 4K-2; block 1 or bank 1 would have addresses 1, 3, 5 ... 4K-1.

Referring to FIG. 6, a memory module with 4 banks (Banks 0-3) each subdivided into 8 blocks (Blocks 0-7) is shown. Assuming that the memory module 512 Kb of memory with a width of 16 bits, then each block is allocated 1K addressable locations (1K×16 bits×32 blocks). In the case where the memory module comprises 4 banks, as shown in FIG. 6, the addresses would be allocated as follows:

Bank 0: every fourth address from 0 (i.e., 0, 4, 8, etc.)
Bank 1: every fourth address from 1 (i.e., 1, 5, 9, etc.)
Bank 2: every fourth address from 2 (i.e., 2, 6, 10, etc.)
Bank 3: every fourth address from 3 (i.e., 3, 7, 11, etc.)

The memory mapping can be generalized for n banks as follows:

Bank 0: every $n^{th}$ address beginning with 0 (i.e. 0, n, 2n, 3n, etc.)
Bank 1: every $n^{th}$ address beginning with 1 (i.e., 1, 1+n, 1+2n, 1+3n, etc.)
Bank n−1: every $n^{th}$ address beginning with n−1 (i.e., n−1, n−1+n, n−1+2n, etc.)

While the invention has been particularly shown and described with reference to various embodiments, it will be recognized by those skilled in the art that modifications and changes may be made to the present invention without departing from the spirit and scope thereof. The scope of the invention should therefore be determined not with reference to the above description but with reference to the appended claims along with their full scope of equivalents.

What is claimed is:

1. A method of sharing a memory module between a plurality of processors comprising:
    dividing the memory module into n banks, where n=at least 2, enabling the memory module to be accessed by one or more processors simultaneously;
    mapping the memory module to allocate sequential addresses to alternate banks of the memory module;
    storing data words in the memory module, wherein data words in sequential addresses are stored in alternate banks due to the mapping of the memory module;
    providing a first signal path, the first signal path coupling a cache to a processor and the memory module when selected, the cache enabling the processor to fetch a plurality of data words from different banks simultaneously;
    dividing the bank into x blocks, where x=at least 1, wherein a block can be accessed by one of the plurality of processors at any one time;
    determining whether contention has occurred, wherein two or more processors are accessing the same address range at any one time, the address range coincides with at least one block;
    synchronizing the processors to access different banks when contention has occurred, wherein the step of synchronizing the processors comprises inserting wait states for processors with lower priorities when contention occurs; and
    activating the first signal path when contention has occurred.

2. The method of claim 1 further including the step of providing a second signal path, the second signal path coupling the processor to the memory module when selected.

3. The method of claim 2 further including a step of activating the second signal path when contention has not occurred.

4. The method of claim 3 further including a step of determining access priorities of the processors when contention has occurred.

5. The method of claim 4 wherein the step of determining access priorities comprises assigning lower access priorities to processors that have caused the contention.

6. A system comprising:
- a plurality of processors;
- a memory module comprising n banks, where n=at least 2, wherein a bank can be accessed by one or more processors at any one time, the bank comprises x blocks, where x=at least 1, wherein a block can be accessed by one of the plurality of processors at any one time;
- a memory map for allocating sequential addresses to alternate banks of the memory module;
- data words stored in memory, wherein data words in sequential addresses are stored in alternate banks according to the memory map;
- a plurality of control logic units for enabling a processor to access a plurality of data words from different banks, wherein a control logic unit comprises first and second signal paths, the first signal path coupling a cache to a processor and the memory module, the second signal path coupling the processor to the memory module, wherein the first signal path comprises a cache register and a multiplexer;
- a flow control unit for synchronizing the processors to access different blocks at any one time; and
- a priority register for storing the access priority of a processor.

7. The system of claim 6 further comprising a plurality of critical memory modules for storing a plurality of data words for the processors to reduce the possibility of contention.

8. The system of claim 6 wherein a control logic unit comprises a first signal path, the first signal path coupling a cache to a processor and the memory module.

* * * * *